United States Patent
Mack

(10) Patent No.: US 10,434,435 B2
(45) Date of Patent: Oct. 8, 2019

(54) SYSTEM AND PROCESS FOR PREHEATING EVAPORATOR FEEDWATER

(71) Applicant: VEOLIA WATER TECHNOLOGIES, INC., Moon Township, PA (US)

(72) Inventor: Benjamin S. Mack, Chicago, IL (US)

(73) Assignee: Veolia Water Technologies, Inc., Moon Township, PA (US)

( * ) Notice: Subject to any disclaimer, the term of this patent is extended or adjusted under 35 U.S.C. 154(b) by 0 days.

(21) Appl. No.: 16/086,327

(22) PCT Filed: Mar. 14, 2017

(86) PCT No.: PCT/US2017/022254
§ 371 (c)(1),
(2) Date: Sep. 19, 2018

(87) PCT Pub. No.: WO2017/172348
PCT Pub. Date: Oct. 5, 2017

(65) Prior Publication Data
US 2019/0099689 A1    Apr. 4, 2019

Related U.S. Application Data

(60) Provisional application No. 62/315,344, filed on Mar. 30, 2016.

(51) Int. Cl.
| | |
|---|---|
| *B01D 1/14* | (2006.01) |
| *B01D 1/28* | (2006.01) |
| *B01D 3/00* | (2006.01) |
| *B01D 3/06* | (2006.01) |
| *B01D 3/10* | (2006.01) |
| *B01D 5/00* | (2006.01) |

(Continued)

(52) U.S. Cl.
CPC ............... *B01D 1/14* (2013.01); *B01D 1/28* (2013.01); *B01D 3/007* (2013.01); *B01D 3/06* (2013.01); *B01D 3/105* (2013.01); *B01D 5/0027* (2013.01); *B01D 19/001* (2013.01); *C02F 1/041* (2013.01); *C02F 1/042* (2013.01); *C02F 1/06* (2013.01); *C02F 1/10* (2013.01); *B01D 1/2803* (2013.01); *Y02P 70/34* (2015.11)

(58) Field of Classification Search
CPC ... B01D 1/14; B01D 1/28; B01D 3/00; B01D 3/06; B01D 3/10; C02F 1/04; C02F 1/10
See application file for complete search history.

(56) References Cited

U.S. PATENT DOCUMENTS 4,094,748 A    6/1978   Schumacher

FOREIGN PATENT DOCUMENTS

| GB | 398099 A | 9/1933 |
|---|---|---|
| GB | 721454 A | 1/1955 |

(Continued)

*Primary Examiner* — Brian A McCaig
(74) *Attorney, Agent, or Firm* — Coats and Bennett PLLC

(57) ABSTRACT

An evaporation system employs a thermocompressor to recover heat associated with a distillate produced by an evaporator and to use the recovered heat to preheat evaporator feedwater. In one example, the thermocompressor produces a thermocompressor discharge that is directed into the deaerator, contacting and preheating the evaporator feedwater passing therethrough. In another example, the thermocompressor discharge is directed through a barometric condenser which contacts evaporator feedwater therein and condenses and in the process preheats the evaporator feedwater.

9 Claims, 2 Drawing Sheets

(51) Int. Cl.
*B01D 19/00* (2006.01)
*C02F 1/04* (2006.01)
*C02F 1/06* (2006.01)
*C02F 1/10* (2006.01)

(56) References Cited

FOREIGN PATENT DOCUMENTS

| | | | |
|---|---|---|---|
| GB | 821983 | A | 10/1959 |
| GB | 1028821 | A | 5/1966 |
| GB | 2417435 | A | 3/2006 |

SYSTEM AND PROCESS FOR PREHEATING EVAPORATOR FEEDWATER

This application is a U.S. National Stage Application of PCT Application No. PCT/EP2017/022254, with an international filing date of 14 Mar. 2017. Applicant claims priority based on U.S. Provisional Patent Application No. 62/315,344 filed 30 Mar. 2016. The subject matter of these applications is incorporated herein.

FIELD OF THE INVENTION

The present invention relates to preheating evaporator feedwater, and more particularly to a system and process that employs a thermocompressor to heat the evaporator feedwater.

BACKGROUND OF THE INVENTION

Many different types of wastewater streams are treated by an evaporation process. Generally a feedwater is directed into an evaporator and the evaporator heats the feedwater, resulting in the production of steam and a concentrate. The steam condenses and forms a distillate that can be used for a variety of purposes. It is typical in evaporation processes to preheat the evaporator feedwater, deaerate the evaporator feedwater, and cool the distillate for storage or use. It is known to employ an indirect contact heat exchanger to transfer heat from the distillate to the evaporator feedwater. The heat recovered minimizes makeup heat duty required for the evaporator and cooling duty to sufficiently cool the distillate for storage or use.

Some evaporator feedwaters contain components such as calcium carbonate that precipitate when heated. One example of this would be produced water generated from oil and gas production. Using a heat exchanger in these cases is problematic. Scale deposits on the heat transfer surfaces and limits heat transfer, or in some cases, can actually plug the heat exchanger. Heat exchanger fouling requires additional cooling duty to sufficiently cool the distillate and additional makeup steam to compensate for the additional preheat load for the evaporator feedwater. In addition, the heat exchanger requires frequent cleaning which results in significant cost for cleaning chemicals and maintenance to keep them operative.

For evaporator feedwaters that include aggressive scaling components, the heat exchanger can scale or foul more rapidly than it can be cleaned. This makes employing a heat exchanger in such cases impractical. In this situation, makeup steam is needed to supply all the preheat duty for the evaporation system. This may be an impractical option depending on the incoming evaporator feedwater temperature.

Therefore, there has been and continues to be a need for an efficient system and process for preheating evaporator feedwater and cooling the distillate produced by an evaporator when the evaporator feedwater includes scaling species that make it impractical to employ an indirect heat exchanger.

SUMMARY OF THE INVENTION

The present invention relates to a system and process for evaporating a feedwater wherein a thermocompressor is employed to preheat the feedwater.

In one embodiment, an evaporator produces a distillate. Heat is recovered from the distillate through flash cooling. Vapors produced by the flash cooling of the distillate are induced into a thermocompressor where the vapors mix with motive steam to form a thermocompressor discharge. In one version of the system and process, the thermocompressor discharge is directed through a deaerator and contacts the evaporator feedwater passing through the deaerator. The thermocompressor discharge preheats the evaporator feedwater and, at the same time, strips non-condensable gases from the evaporator feedwater in the deaerator. In another version of the present process, the evaporator feedwater, prior to reaching the deaerator, is directed into and through a barometric condenser. The thermocompressor discharge in this design is directed into the barometric condenser and preheats the evaporator feedwater. After the evaporator feedwater has been preheated in the barometric condenser, it is directed to the deaerator and from the deaerator the evaporator feedwater is directed to the evaporator.

In one embodiment, the present invention entails a method of preheating and treating evaporator feedwater. Evaporative feedwater is directed to an evaporator which evaporates the feedwater and produces a distillate. The method or process entails recovering heat from the distillate by flash cooling the distillate and in the process of flash cooling the distillate, producing vapor. The method entails utilizing at least some of the heat recovered from the distillate to preheat the evaporator feedwater prior to entering the evaporator. This is achieved by inducing the vapor resulting from the flash cooling of the distillate into a thermocompressor. Vapor induced into the thermocompressor is mixed with a motive fluid such as steam in the thermocompressor to form a thermocompressor discharge. Evaporator feedwater upstream of the evaporator is contacted with the thermocompressor discharge and heat is transferred from the thermocompressor discharge to the evaporator feedwater so as to preheat the evaporator feedwater.

In another embodiment, there is disclosed a method of preheating and treating evaporator feedwater by directing the evaporator feedwater to and through a deaerator. Evaporator feedwater is directed from the deaerator to an evaporator which evaporates the feedwater and produces a distillate. The distillate is flash cooled to produce flash vapor. Motive steam is directed into a thermocompressor and this induces the flash vapor resulting from the flash cooling of the distillate into the thermocompressor where the flash vapor mixes with the motive steam to form a thermocompressor discharge. The thermocompressor discharge is directed into and through the deaerator where the thermocompressor discharge contacts the evaporator feedwater passing through the deaerator. This preheats and deaerates the evaporator feedwater.

Another embodiment entails the same preheating and treating of the evaporator feedwater but here evaporator feedwater is directed to an evaporator which evaporates the feedwater to produce a distillate. Then the method includes flash cooling the distillate and producing flash vapor. Motive steam is directed into a thermocompressor which induces the flash vapor resulting from the flash cooling of the distillate into the thermocompressor where the flash vapor mixes with the motive steam to form a thermocompressor discharge. Prior to directing the evaporator feedwater to the evaporator, the method entails directing the evaporator feedwater to a barometric condenser. Evaporator feedwater is preheated in the barometric condenser by directing the thermocompressor discharge into the barometric compressor where the thermocompressor discharge preheats the evaporator feedwater. After the evaporator feedwater is preheated in the barometric condenser, the evaporator feedwater is directed to a deaerator that deaerates the evaporator feedwater and thereafter the deaerated feedwater is directed to the evaporator.

In another embodiment, a system for preheating and treating evaporator feedwater is disclosed. The system includes an evaporator for receiving the evaporator feedwater and evaporating the evaporator feedwater to produce a distillate. The system further includes a tank for receiving the distillate and for flash cooling the distillate to produce a vapor. In addition, the system includes a thermocompressor having a motive fluid or steam inlet, a suction inlet, and a discharge outlet. There is also provided a motive fluid or steam line connected to the motive fluid or steam inlet of the thermocompressor for directing a motive fluid or steam into the thermcompressor. Further, the system includes a vapor line operatively interconnecting a vent associated with the distillate tank and the suction inlet of the thermocompressor for conveying vapor from the distillate tank to the thermocompressor. The thermocompressor is configured to induce vapor from the distillate tank through the vent and vapor line into the suction inlet of the thermocompressor where the motive fluid or steam mixes with the vapor to form a thermocompressor discharge. The system also includes a discharge line operatively connected to the discharge outlet of the thermocompressor for directing the thermocompressor discharge to a point upstream of the evaporator where the thermocompressor discharge contacts the evaporator feedwater and heat is transferred from the thermocompressor discharge to the evaporator feedwater so as so to preheat the evaporator feedwater prior to reaching the evaporator.

Other objects and advantages of the present invention will become apparent and obvious from a study of the following description and the accompanying drawings which are merely illustrative of such invention.

DESCRIPTION OF EXEMPLARY EMBODIMENTS

The present invention relates to a system and process for preheating evaporator feedwater, especially feedwater that is prone to scale surfaces of a heat exchanger. As described below, in one embodiment evaporator feedwater is directed into and through a deaerator 14 from which the feedwater is directed into an evaporator 12 which produces a distillate. The distillate is flash cooled and produces flash vapors that are induced into a thermocompressor or eductor 20 where the vapors mix with a motive fluid such as steam to form a thermocompressor discharge. As used herein, the term "thermocompressor" encompasses an eductor. The thermocompressor discharge, in one embodiment, is directed from the thermocompressor or eductor 20 to the deaerator 14 and moves through the deaerator contacting the evaporator feedwater passing therethrough. A portion of the thermocompressor discharge condenses in the deaerator and transfers its latent heat to the evaporator feedwater passing therethrough, thereby increasing the temperature of the evaporator feedwater. The remaining thermocompressor discharge strips any non-condensable gases present form the evaporator feedwater and exits the deaerator through a vent. Also discussed herein is a second embodiment where the evaporator feedwater and thermocompressor discharge are both directed to and through a barometric condenser. Here the evaporator feedwater is preheated by heat transferred from the thermocompressor discharge to the evaporator feedwater.

Figure 1:
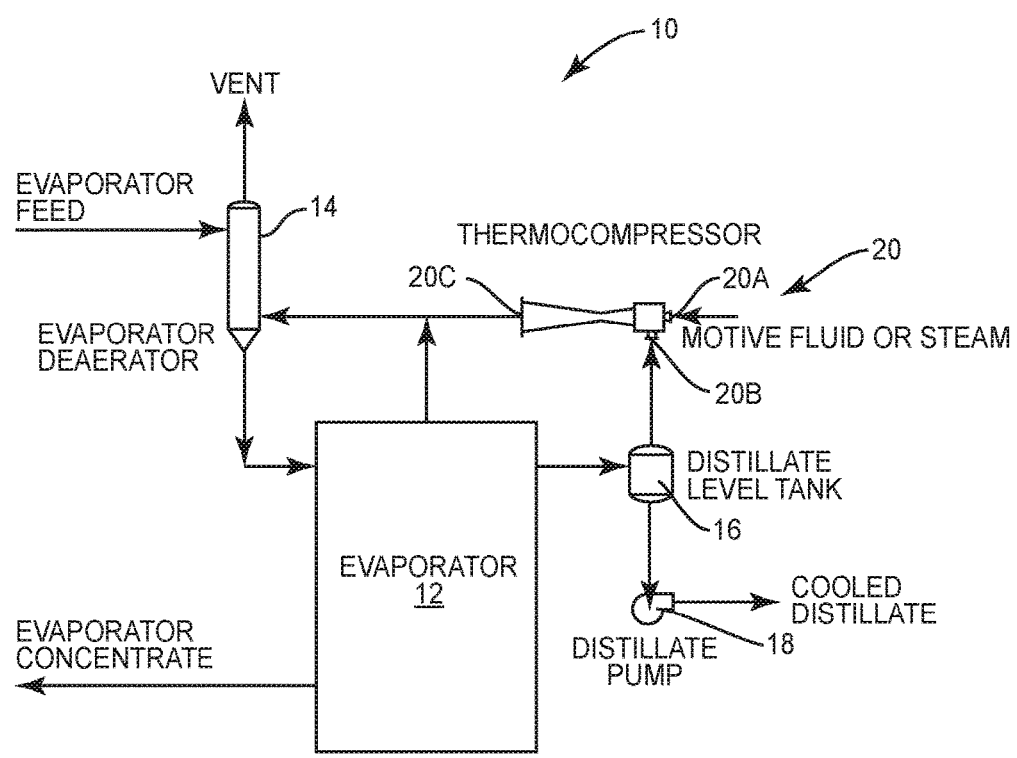
FIG. 1 is a schematic illustration of an evaporation system for treating a feedwater where a thermocompressor is employed to preheat the evaporator feedwater.

With particular reference to the drawings and FIG. 1, there is shown therein an evaporation system indicated generally by the numeral 10. Evaporation system 10 is operative to treat various feedwater or wastewater streams. Evaporation system 10 includes the evaporator 12. Various types of evaporators can be employed. In one embodiment, the evaporator 12 may comprise a vertical falling film evaporator that produces steam and a concentrate. The steam produced condenses to form a distillate that can be used in various ways.

Upstream of the evaporator 12 is a deaerator 14. Deaerator 14 is employed to strip non-condensable gases from the evaporator feedwater. As is discussed below, in the present process the deaerator 14 performs an additional function. The deaerator 14 is used to preheat the evaporator feedwater passing through the deaerator.

Distillate produced by the evaporator 12 is directed to a distillate tank 16. A distillate pump 18 is operatively connected or associated with the distillate tank 16 to pump distillate therefrom. Distillate tank 16 includes a vent for venting flash vapors from the distillate tank via a vapor line to the thermocompressor or eductor 20. Thermocompressor 20 includes a motive fluid or steam inlet 20A, a suction inlet 20B and a discharge outlet 20C. The vapor line extending from the distillate tank 16 is operatively connected to the suction inlet 20B of the thermocompressor 20. To drive the thermocompressor, motive steam is directed into the motive fluid inlet 20A of the thermocompressor 20. This results in the thermocompressor 20 drawing a vacuum on the distillate tank 16. Distillate directed from the evaporator 12 into the distillate tank 16 undergoes a pressure drop resulting in the distillate flashing vapors (and being cooled in the process) which are induced into the thermocompressor 20. The vapors from the distillate are mixed with the motive steam to form a steam-vapor mixture which is referred to as thermocompressor discharge. In some cases, as illustrated in the drawings, steam produced by the evaporator 12 can be mixed with the thermocompressor discharge prior to the thermocompressor discharge preheating the evaporator feedwater.

Thermocompressor discharge from the thermocompressor 20 is directed into the deaerator 14 and moves through the deaerator generally counter to the flow of evaporator feedwater therein. A portion of the thermocompressor discharge condenses in the deaerator 14 and in the process transfers latent heat to the evaporator feedwater and preheats the same. Remaining thermocompressor discharge passing through the deaerator 14 strips non-condensable gases from the evaporator feedwater and is vented from the deaerator.

It is appreciated that the system and process described above avoids heat exchanger scaling when preheating evaporator feedwater that includes relatively high concentrations of scaling components. Preheating the evaporator feedwater in the deaerator 14 allows any scaling components to precipitate in the bulk liquid instead of directly on heat transfer surfaces.

In addition, the system and process is energy efficient. The process maximizes heat recovery from the outgoing distillate through flash cooling. As noted above, the thermocompressor 20 imparts a vacuum on the distillate tank 16 to achieve a desirable distillate temperature. At the same time, the thermocompressor 20 boosts the flash vapors up to a pressure that can be used for preheating the evaporator feedwater in the deaerator 14. This provides at least two benefits. First, this reduces or even eliminates cooling duty to meet distillate discharge requirements. Secondly, this system and process reduces the makeup steam required to sufficiently preheat the evaporator feedwater.

Figure 2:
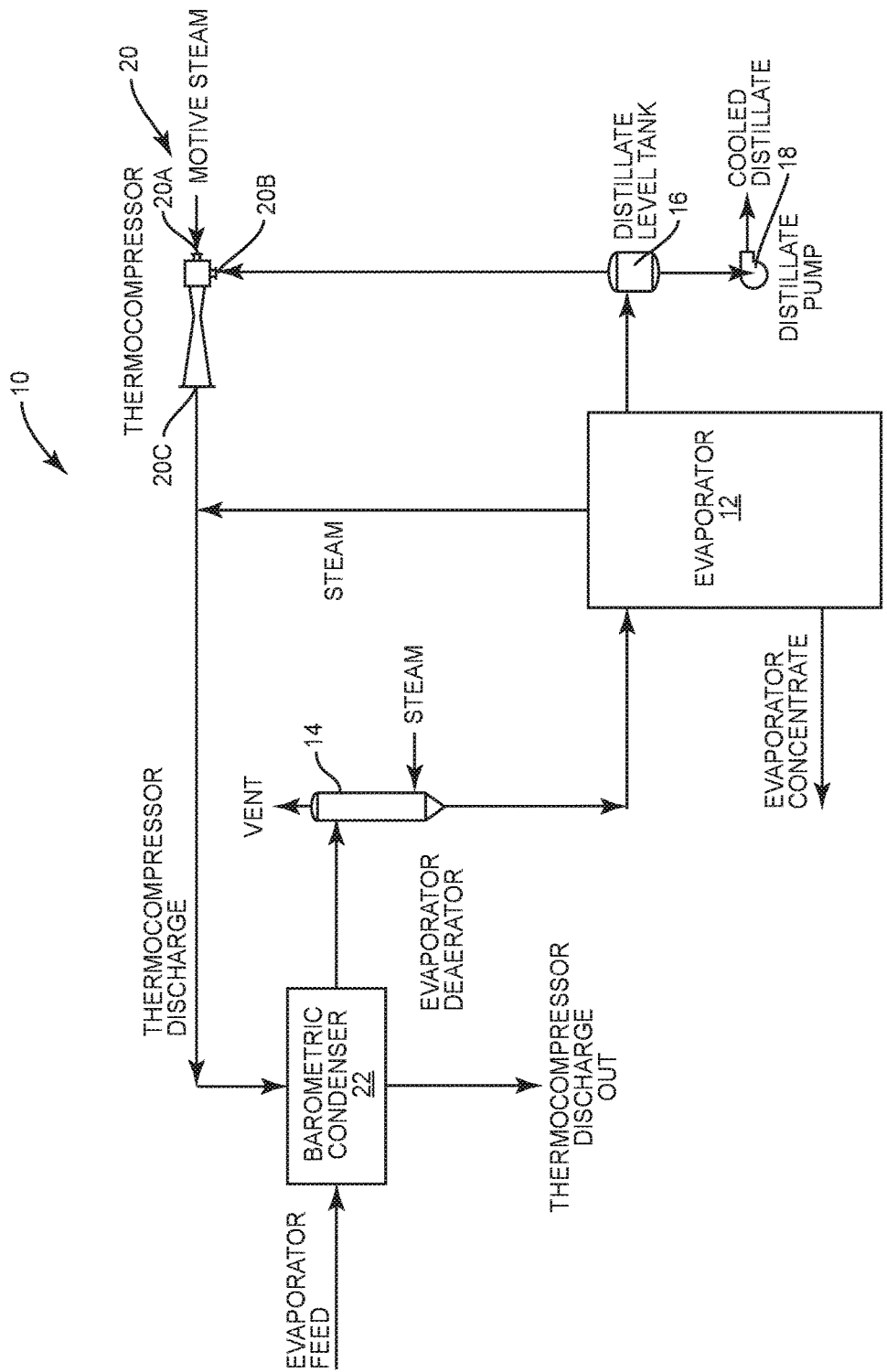
FIG. 2 is a schematic illustration of a similar evaporation system where the thermocompressor is employed along with a barometric condenser to preheat evaporator feedwater.

FIG. 2 depicts an alternate embodiment of a system and process for preheating evaporator feedwater. The system and process shown in FIG. 2 is particularly applicable in cases where the temperature of the evaporator feedwater is relatively low. Shown in FIG. 2 is a barometric condenser 22 that is disposed upstream of the evaporator 12 and downstream of the thermocompressor 20. The thermocompressor discharge and the evaporator feedwater are directed into and through the barometric condenser 22. Thermocompressor discharge contacts the evaporator feedwater in the barometric condenser 22 and condenses, thereby preheating the evaporator feedwater passing through the barometric condenser. The preheated evaporator feedwater exiting the barometric condenser 22 is then directed into and through the deaerator 14 where non-condensable gases are stripped from the evaporator feedwater. As in the FIG. 1 embodiment, evaporator feedwater discharged from the deaerator 14 is directed to the evaporator 12.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of pre-heating and treating evaporator feedwater comprising:
    directing evaporator feedwater to and through a deaerator;
    directing the evaporator feedwater from the deaerator to an evaporator and evaporating the feedwater to produce a distillate;
    flash cooling the distillate and producing flash vapor;
    directing motive steam into a thermocompressor and inducing the flash vapor resulting from the flash cooling of the distillate into the thermocompressor where the flash vapor mixes with the motive steam to form a thermocompressor discharge;
    directing the thermocompressor discharge to the deaerator; and
    directing the thermocompressor discharge through the deaerator and contacting the evaporator feedwater therein to preheat and deaerate the evaporator feedwater.

2. The method of claim 1 including directing the distillate to a distillate tank and flash cooling the distillate in the distillate tank.

3. The method of claim 1 including:
    directing the distillate to a distillate tank;
    drawing a vacuum on the distillate tank with the thermocompressor; and
    recovering heat from the distillate by flash cooling the distillate in the distillate tank and exchanging at least a portion of the recovered heat to preheat the evaporator feedwater.

4. The method of claim 1 including:
    directing the distillate from the evaporator to a distillate tank where the distillate undergoes a pressure drop which results in the flash vapor; and
    inducing the flash vapor from the distillate tank into a suction inlet of the thermocompressor where the vapor mixes with the steam to form the thermocompressor discharge.

5. The method of claim 4 wherein the distillate tank includes a vent and wherein the vent is operative to direct the vapor from the distillate tank into a vapor line that is operatively connected between the suction inlet of the thermocompressor and the vent.

6. The method of claim 1 further including directing steam into an inlet of the thermocompressor which induces the vapor produced by flash cooling the distillate into a suction inlet of the thermocompressor.

7. A method of preheating and treating evaporator feedwater comprising:
    directing the evaporator feedwater to an evaporator and evaporating the feedwater to produce a distillate;
    flash cooling the distillate and producing flash vapor;
    directing motive steam to a thermocompressor and inducing the flash vapor resulting from the flash cooling of the distillate into the thermocompressor where the flash vapor mixes with the motive steam to form a thermocompressor discharge;
    prior to directing the evaporator feedwater to the evaporator, directing the evaporator feedwater to a barometric condenser;
    preheating the evaporator feedwater in the barometric condenser by directing the thermocompressor discharge into the barometric compressor and contacting the evaporator feedwater with the thermocompressor discharge; and
    directing the preheated evaporator feedwater to a deaerator and deaerating the evaporator feedwater and directing the deaerated feedwater to the evaporator.

8. The method of claim 7 further including:
    directing the distillate from the evaporator to a distillate tank where the distillate undergoes a pressure drop which results in the flash vapor; and
    inducing the flash vapor from the distillate tank into a suction inlet of the thermocompressor where the vapor mixes with the steam to form the thermocompressor discharge.

9. The method of claim 7 wherein the evaporator produces steam and the method includes mixing the steam produced by the evaporator with the thermocompressor discharge prior to the thermocompressor discharge preheating the evaporator feedwater.

* * * * *